(12) United States Patent
Sunaga et al.

(10) Patent No.: US 6,890,081 B2
(45) Date of Patent: May 10, 2005

(54) OPTICAL ELEMENT AND OPTICAL SYSTEM HAVING THE SAME

(75) Inventors: Toshihiro Sunaga, Kawasaki (JP); Hiroaki Hoshi, Fujisawa (JP); Takeshi Akiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 95 days.

(21) Appl. No.: 10/391,609

(22) Filed: Mar. 20, 2003

(65) Prior Publication Data

US 2003/0179474 A1 Sep. 25, 2003

Related U.S. Application Data

(62) Division of application No. 09/405,130, filed on Sep. 24, 1999, now Pat. No. 6,637,899.

(30) Foreign Application Priority Data

Sep. 25, 1998 (JP) .............................. 10-288826

(51) Int. Cl.$^7$ ............................ G02B 5/10; G02B 17/00
(52) U.S. Cl. ................... 359/858; 359/859; 359/861; 359/727; 359/731; 359/631; 359/633; 264/1.1; 264/2.5
(58) Field of Search ................................. 359/857, 858, 359/859, 861, 726, 631, 633, 833, 834, 837, 727, 730, 731; 264/1.1, 2.5

(56) References Cited

U.S. PATENT DOCUMENTS

| | | | |
|---|---|---|---|
| 4,173,394 A | 11/1979 | Clave et al. ................. | 350/181 |
| 5,453,877 A | 9/1995 | Gerbe et al. ................. | 359/633 |
| 5,768,025 A | 6/1998 | Togino et al. ............... | 359/633 |
| 5,790,312 A | 8/1998 | Togino ........................ | 359/631 |
| 5,815,326 A | 9/1998 | Takahashi .................... | 359/729 |
| 5,880,888 A | 3/1999 | Schoenmakers et al. .... | 359/631 |
| 5,912,769 A | 6/1999 | Iizuka et al. ................. | 359/631 |
| 5,917,662 A | 6/1999 | Sekita ......................... | 359/729 |
| 5,946,147 A | 8/1999 | Tanaka et al. ............... | 359/831 |
| 5,959,780 A | 9/1999 | Togino et al. ............... | 359/630 |
| 5,973,858 A | 10/1999 | Sekita ......................... | 359/729 |
| 5,995,287 A | 11/1999 | Sekita ......................... | 359/599 |
| 6,166,866 A | 12/2000 | Kimura et al. ............... | 359/729 |
| 6,215,596 B1 | 4/2001 | Araki et al. .................. | 359/631 |
| 6,243,208 B1 | 6/2001 | Uehara et al. ............... | 359/631 |
| 6,278,554 B1 * | 8/2001 | Aratani et al. | |
| 6,282,018 B1 | 8/2001 | Sunaga ........................ | 359/365 |
| 6,301,064 B1 | 10/2001 | Araki et al. .................. | 359/834 |
| 6,324,012 B1 | 11/2001 | Aratani et al. ............... | 359/627 |
| 6,335,837 B1 | 1/2002 | Aratani et al. ............... | 359/796 |
| 6,337,773 B1 * | 1/2002 | Kawano et al. | |
| 6,362,921 B1 * | 3/2002 | Iida et al. | |
| 6,409,352 B1 | 6/2002 | Sunaga ........................ | 359/859 |
| 6,637,899 B2 * | 10/2003 | Sunaga et al. | |

* cited by examiner

Primary Examiner—Ricky D. Shafer
(74) Attorney, Agent, or Firm—Fitzpatrick, Cella, Harper & Scinto (57) ABSTRACT

An optical element formed from a transparent optical material includes two refraction surfaces, a first reflection surface group having a plurality of internal reflection surfaces arrayed in a predetermined direction, a second reflection surface group opposing the first reflection surface group and having at least one internal reflection surface and two side surfaces opposing each other in parallel to the predetermined direction. Light incident from one of the refraction surfaces is alternately reflected by the internal reflection surfaces of the first reflection surface group and the internal reflection surface of the second reflection surface group and guided to the other refraction surface. The width of at least one of the plurality of internal reflection surfaces of the first reflection surface group and at least one internal reflection surface of the second reflection surface group in a direction in which the two side surfaces oppose each other is smaller than the distance between the two side surfaces in the direction in which the side surfaces oppose each other.

12 Claims, 8 Drawing Sheets

X-Z CROSS SECTION

Y-Z CROSS SECTION

OPTICAL ELEMENT AND OPTICAL SYSTEM HAVING THE SAME

This application is a division of application Ser. No. 09/405,130 filed Sep. 24, 1999, now U.S. Pat. No. 6,637,899.

BACKGROUND OF THE INVENTION

1. Field of the Invention

The present invention relates to an optical element and an optical system using the same and, more particularly, to an optical system for a video camera, still video camera viewfinder, or a copying machine using an optical element integrating a plurality of reflection surfaces with curvatures.

2. Related Background Art

Conventionally, a variety of optical systems using the reflection surfaces of concave mirrors or convex mirrors have been proposed.

For example, U.S. Pat. No. 4,775,217 or Japanese Patent Application Laid-Open No. 2-297516 discloses an optical prism whose optical block has a reflection surface with a curvature.

Figure 11:
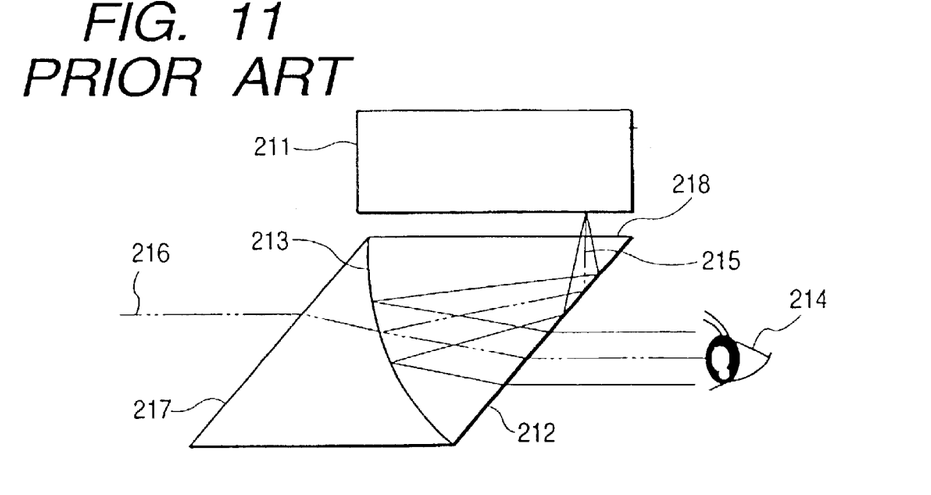
FIG. 11 is a view showing another conventional observation optical system having a prism reflection surface with a curvature.

U.S. Pat. No. 4,775,217 is associated with the arrangement of the eyepiece of an observation optical system. FIG. 11 shows this arrangement.

In the observation optical system shown in FIG. 11, display light 215 from an information display 211 is incident from an incident surface 218, is reflected to the object side by a total reflection surface 212, and reaches a concave surface 213 having a curvature.

The display light 215 that is output from the information display 211 as divergent light is converted into almost collimated light by the power of the concave surface 213 and enters a pupil 214 of the observer through the total reflection surface 212, so the observer recognizes the image displayed on the information display 211.

In this prior art, the object image can also be recognized simultaneously with observation of the displayed image.

Object light 216 is incident on a surface 217 nearly parallel to the total reflection surface 212 and reaches the concave surface 213. For example, a semi-transparent film is deposited on the concave surface 213. The object light 216 half-transmitted through the concave surface 213 passes through the total reflection surface 212 and enters the pupil 214 of the observer. Hence, the observer can observe the object light 216 and the display light 215 in a superposed state.

In a non-coaxial optical system, when asymmetrical aspherical surfaces are formed as constituent surfaces on the basis of the idea of a reference axis (to be described later), a compact observation optical system whose aberration is sufficiently corrected can be constructed. Japanese Patent Application Laid-Open No. 9-5650 discloses a method of designing the optical system. Japanese Patent Application Laid-Open Nos. 8-292371 and 8-292372 disclose examples of design.

Such a non-coaxial optical system is called an off-axial optical system (An off-axial optical system is defined as an optical system including surfaces (off-axial optical surfaces) whose surface normals at the intersections between the surfaces and a reference axis are not present on the reference axis which is along a light beam passing through the image center and the pupil center. At this time, the reference axis bends).

In this off-axial optical system, generally, the constituent surfaces are non-coaxial, and the reflection surfaces do not generate an eclipse. For this reason, an optical system using reflection surfaces can be easily constructed. In addition, an integrated optical system can be easily constructed by integrally molding the constituent surfaces. With this method, the optical path can be relatively freely guided.

Hence, a compact reflection optical element with a high space efficiency and free shape can be formed.

However, in the integrally molded optical block of the off-axial optical system, when the number of reflection surfaces is increased for the purpose of, e.g., aberration correction of the optical block, influences of surface shape errors or surface distortion as manufacturing errors of the reflection surfaces accumulate. The error amount allowable in each reflection surface becomes smaller and stricter as the number of reflection surfaces increases. For this reason, the surface shape of each reflection surface must be accurately guaranteed.

An optical system with a small image size, which is disclosed in, e.g., Japanese Patent Application Laid-Open No. 8-292371 or 8-292372, has large curvatures, and the required accuracy against surface errors or surface distortion is high.

This also applies to the observation optical system disclosed in U.S. Pat. No. 4,775,217 or Japanese Patent Application Laid-Open No. 2-297516 when a compact high-performance optical system is constructed.

The characteristic features of the reflection optical elements disclosed in Japanese Patent Application Laid-Open Nos. 8-292371 and 8-292372 will be described next.

Figure 12:
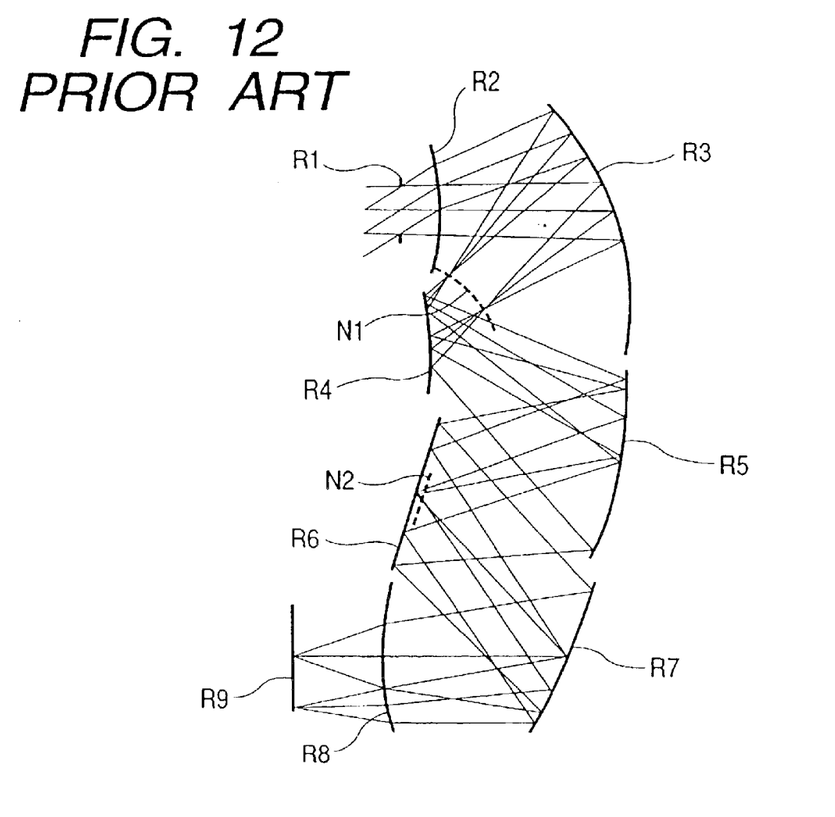
FIG. 12 is a view showing the conventional optical element having the prism reflection surface with the curvature shown in FIGS. 8 and 9.

FIG. 12 shows an embodiment disclosed in Japanese Patent Application Laid-Open No. 8-292371. This optical system has an intermediate imaging plane N1 and a pupil N2 of the optical system. The intermediate imaging plane is formed near a second reflection surface R4 counted from an incident surface R2 along the optical path, i.e., one of reflection surfaces having curvatures.

The pupil is formed near a second reflection surface R6 reversely counted from the exit surface along the optical path, i.e., one of the reflection surfaces having curvatures. If a first reflection surface R3 having a curvature, which is counted from the incident surface R2 along the optical path, has a convergence function, the intermediate imaging plane N1 readily forms near the above-described reflection surface R4. If a final reflection surface R7 having a curvature, which is counted from the incident surface along the optical path, has a convergence function, the pupil N2 readily forms near the above-described reflection surface R6.

These surfaces are sensitive to distortion and spherical aberration, so the surface shapes must be accurately guaranteed.

To form an optical block having a plurality of reflection surfaces, molding using a mold is widely used because of the recent requirement for simplicity. When the mold is larger than the optical effective portion to some extent, the influence of the surface distortion near the reflection surfaces on the optical effective portion becomes small.

A large mold is also advantageous in guaranteeing the positional accuracy of each reflection surface. In a process using a synthetic resin, changes in dimensions due to shrinkage in molding or the use environment must be taken into consideration because the thermal expansion coefficient of the synthetic resin is larger than that of an inorganic material by one order of magnitude. In association with the optical characteristics, not only the molding accuracy but also molding shrinkage and molecular orientation need to be taken into consideration.

Molding shrinkage influences the dimension accuracy of the entire molded body. Local shrinkage in cooling appears as residual distortion or deformation. Generally, when a molding material hardens in a mold, shrinking stress remains because the material cannot freely shrink. When a molded body formed from a soft material is released from a mold, such stress is released to warp the molded body. For a hard material such as polystyrene, polymethyl methacrylate, or polycarbonate, stress is not released, and a molded body maintains its shape with residual stress.

This stress is called internal stress. When the molded body comes into contact with, e.g., a solvent, a crack readily forms. The molded body may spontaneously break during use.

In consideration of this problem, Japanese Patent Application Laid-Open No. 8-122505 discloses an examination in which when a plurality of optical components are to be integrally formed as one optical member, contact surfaces at a joint portion are formed into appropriate shapes, and two surfaces adjacent to each other are smoothly joined at the boundary. This decreases residual stress on the optical member in the molding process to reduce manufacturing errors.

However, not all optical members can always be smoothly joined. When a design is made to smoothly join an optical member, the optical performance cannot be maintained.

Figure 8:
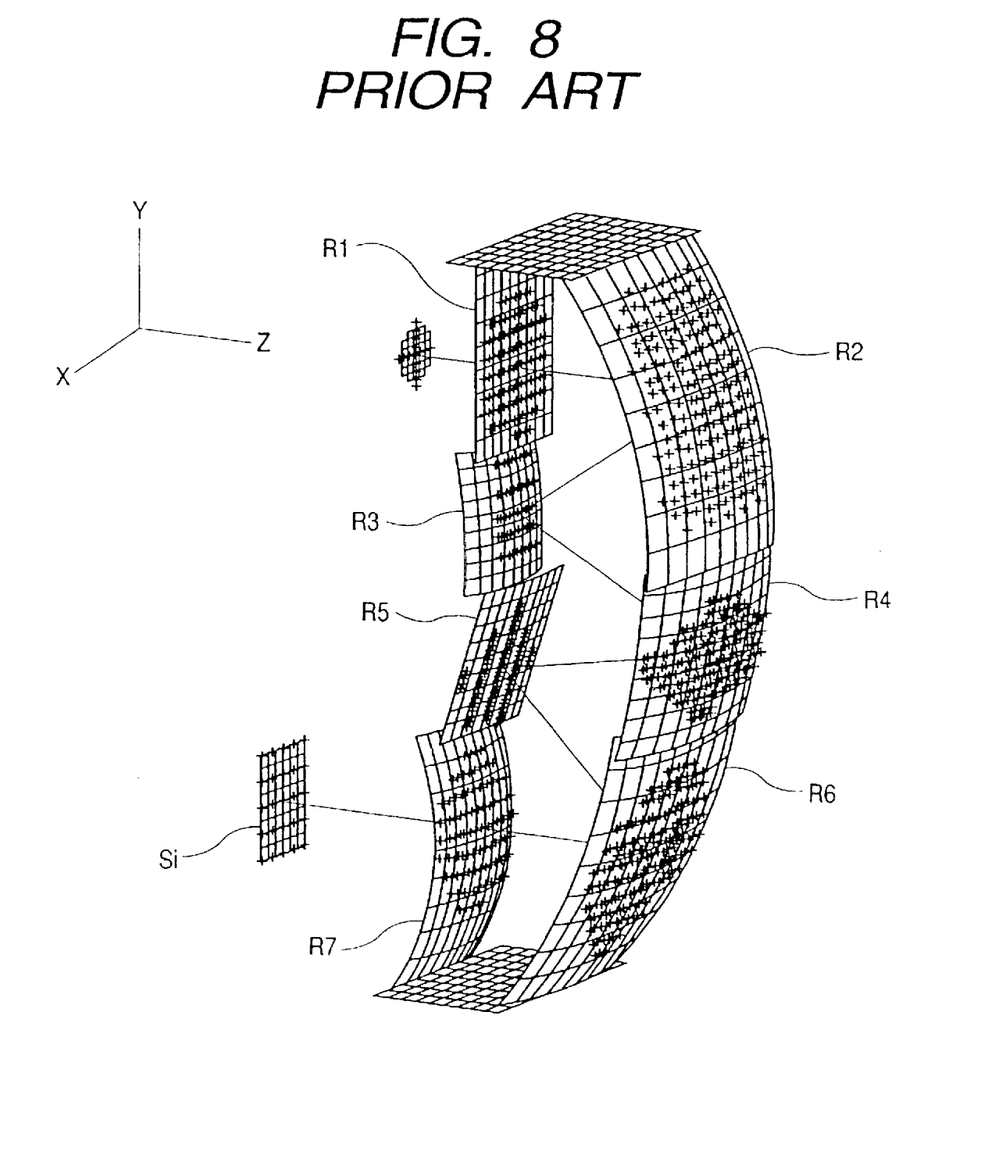
FIG. 8 is a view showing the incident states of a light beam on a conventional reflection optical element having a prism reflection surface with a curvature.

FIG. 8 is a perspective view showing the surface shapes of a reflection optical element disclosed in Japanese Patent Application Laid-Open No. 8-292371, and the incident states of an incident light beam on the reflection surfaces. A cluster of symbols "+" represents a light beam incident on each optical surface.

Figure 9:
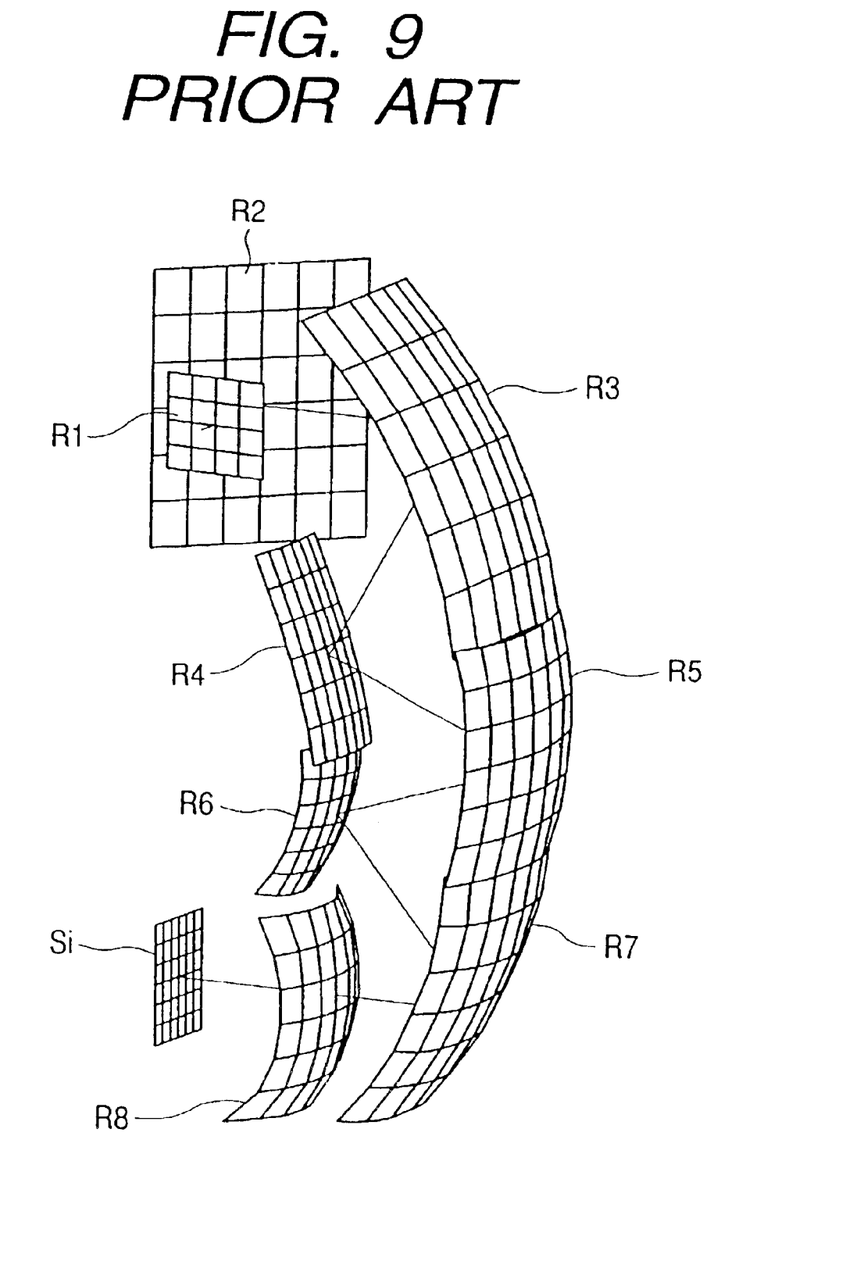
FIG. 9 is a perspective view showing the optical surfaces of the conventional reflection optical element having the prism reflection surface with the curvature.

FIG. 9 is a perspective view showing only the surface shapes of a reflection optical element of another embodiment of this prior art.

Referring to FIG. 8, the optical element has refraction surfaces R1 and R7, reflection surfaces R2 to R6 forming two reflection surface groups opposing each other, and an image sensing element Si such as a CCD. A light beam from an object is incident from the incident surface R1, is repeatedly reflected by the reflection surfaces R2 to R6, exits from the exit surface R7, and forms an image on the image sensing element Si (image sensing surface). As shown in FIG. 8, the light is incident on the reflection surfaces in various states.

Referring to FIG. 9, the optical element has refraction surfaces R1 and R8, a reflection surface R2 which does not oppose two reflection surface groups opposing each other, reflection surfaces R3 to R7 forming two reflection surface groups opposing each other, and an image sensing element Si such as a CCD.

A light beam from an object is incident from the incident surface R1. The direction of light is changed by the reflection surface R2. The light beam is repeatedly reflected by the reflection surfaces R3 to R7, exits from the exit surface R8, and forms an image on the image sensing element Si (image sensing surface).

In the example shown in FIG. 8, the curvature of the reflection surface R3 is large. In FIG. 9, the curvature of the reflection surface R6 is large. The curvatures of surfaces adjacent to each other, i.e., the surfaces R1, R3, R5, and R7 in FIG. 8 or the surfaces R4, R6, and R8 in FIG. 9 are largely different. For this reason, it is hard to smoothly join these surfaces.

Figure 10A:
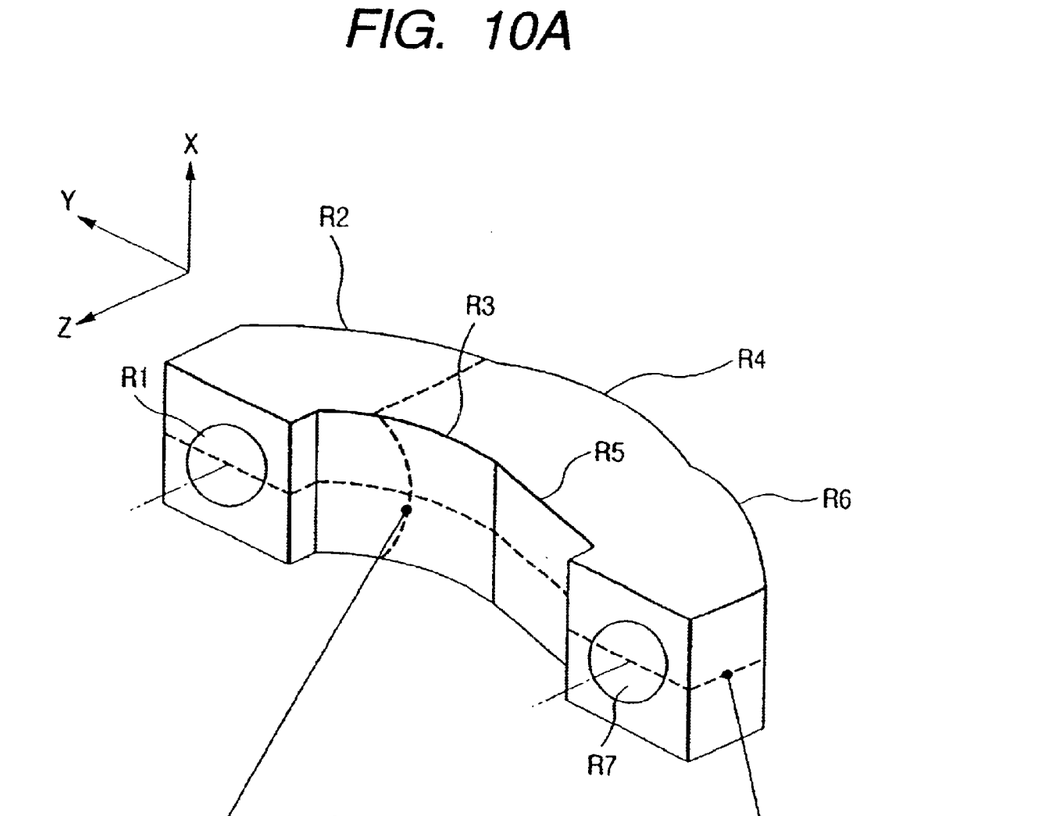
FIGS. 10A, 10B, and 10C are sectional views showing the conventional reflection optical element having the prism reflection surface with the curvature.
Figure 10B:
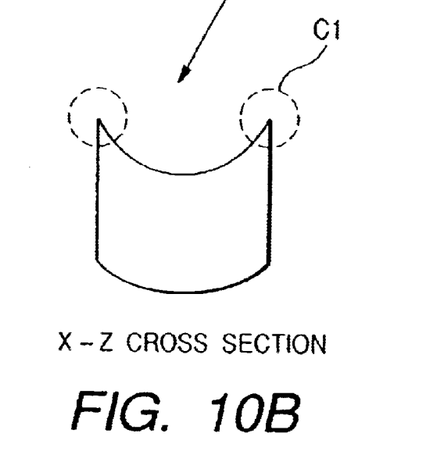
Figure 10C:
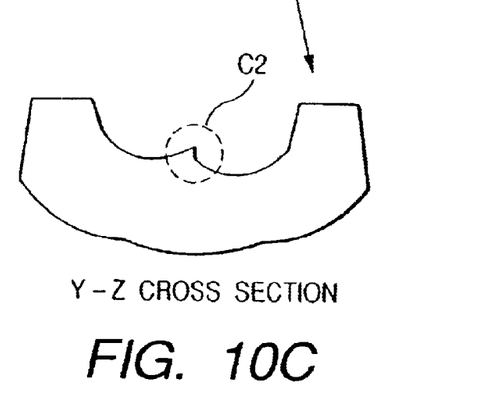

As is apparent from FIGS. 8 and 9, when a surface with a large curvature is simply extended to side surfaces while maintaining the surface shape of the optical surface, or when cross sections of adjacent surfaces with largely different curvatures are simply joined as shown in FIGS. 10A, 10B, and 10C, the resultant optical element has sharp ridge portions C1 on the side surfaces or a step at a joint portion C2 between the optical surfaces.

Generally, when reflection surfaces are larger than the optical effective portion to some extent, it is advantageous to guarantee the surface accuracy of or positional accuracy of each reflection surface. In this case, an accurate surface shape can be guaranteed by ensuring the placing of an optical reflection surface to a portion near the optical effective portion and compensating for other portions using shapes different from the shape of the optical reflection surface.

As shown in FIGS. 8 and 9, a surface having a large curvature and small optical effective portion is often convex facing the inside of the device.

When surfaces before and after such a surface have a convergence function, the optical effective portion of this surface inevitably becomes small.

As described above, these surfaces are sensitive to distortion and spherical aberration, so the surface shapes must be accurately guaranteed. Generally, a molding auxiliary portion such as a draft or an ejection portion formed from an ejector pin is prepared at a predetermined position of the reflection optical element, thereby suppressing manufacturing errors. To suppress manufacturing errors and guarantee the optical performance, the molding auxiliary portion is preferably formed near a reflection surface.

An optical element represented by Japanese Patent Application Laid-Open No. 8-292371 aims at forming a compact and free shape. For this reason, the degree of freedom in forming a draft or an ejection portion by an ejector pin is low, like conventional optical elements.

Japanese Patent Application Laid-Open Nos. 8-292371 and 8-292372 disclose a means for obtaining the surface shape of the optical effective portion. Japanese Patent Application Laid-Open Nos. 8-292371 and 8-292372 do not disclose any specific method of forming shapes other than the optical surface.

SUMMARY OF THE INVENTION

It is an object of the present invention to construct a reflection optical element having a minimum step at the boundary between an optical surface and a side surface or at the boundary between optical surfaces, or having a minimum surface shape error in molding.

In order to achieve the above object, according to the first aspect of the present invention, there is provided an optical element formed from a transparent optical material, comprising:

two refraction surfaces;

a first reflection surface group having a plurality of internal reflection surfaces arrayed in a predetermined direction;

a second reflection surface group opposing the first reflection surface group and having at least one internal reflection surface; and two side surfaces opposing each other in parallel to the predetermined direction, wherein light incident from one refraction surface is alternately reflected by the internal reflection surfaces of the first reflection surface group and the internal reflection surface of the second reflection surface group and guided to the other refraction surface, and at least one of the plurality of internal reflection surfaces of the first reflection surface group and at least one internal reflection surface of the second reflection surface group has, in a direction in which the two side surfaces oppose each other, a width smaller than the distance between the two side surfaces in the direction in which the side surfaces oppose each other.

According to the second aspect of the present invention, there is provided an optical element formed from a transparent optical material, comprising:

two refraction surfaces;

a first reflection surface group having a plurality of internal reflection surfaces arrayed in a predetermined direction;

a second reflection surface group opposing the first reflection surface group and having at least one internal reflection surface;

two side surfaces opposing each other in parallel to the predetermined direction; and a molding auxiliary portion provided at a portion which does not substantially influence optical performance, wherein light incident from one refraction surface is alternately reflected by the internal reflection surfaces of the first reflection surface group and the internal reflection surface of the second reflection surface group and guided to the other refraction surface.

According to the third aspect of the present invention, there is provided an optical system comprising the optical element of the first or second aspect of the present invention and an aperture stop.

DETAILED DESCRIPTION OF THE PREFERRED EMBODIMENTS

An optical element of the present invention has no axis of symmetry, unlike an optical axis in a normal optical system. Instead, a "reference axis" is set in the optical element. The arrangement of elements in the optical element will be described on the basis of this reference axis.

First, the definition of the reference axis will be described. Generally, the optical path of a light beam with a reference wavelength, which serves as a reference from an object surface to an image plane, is defined as the "reference axis" of the optical element. The light beam as the reference is not determined under only this condition. Normally, the reference axis light beam is set in accordance with one of the following two principles.

(A-1) When an axis of symmetry is present even locally in the optical element, and aberration can be symmetrically corrected, a light beam passing on the axis of symmetry is set as the reference axis.

(A-2) When no axis of symmetry is present in the optical element in general, or when aberration cannot be symmetrically corrected although an axis of symmetry is locally present, a light beam emerging from the center of an object surface (the center of a range to be photographed or observed), passing through the optical element in the order of designated surfaces, and then passing through the stop center, or a light beam passing through the stop center and reaching the center of the final image plane is set as a reference axis light beam. The optical path of the light beam is set as the reference axis.

Figure 1:
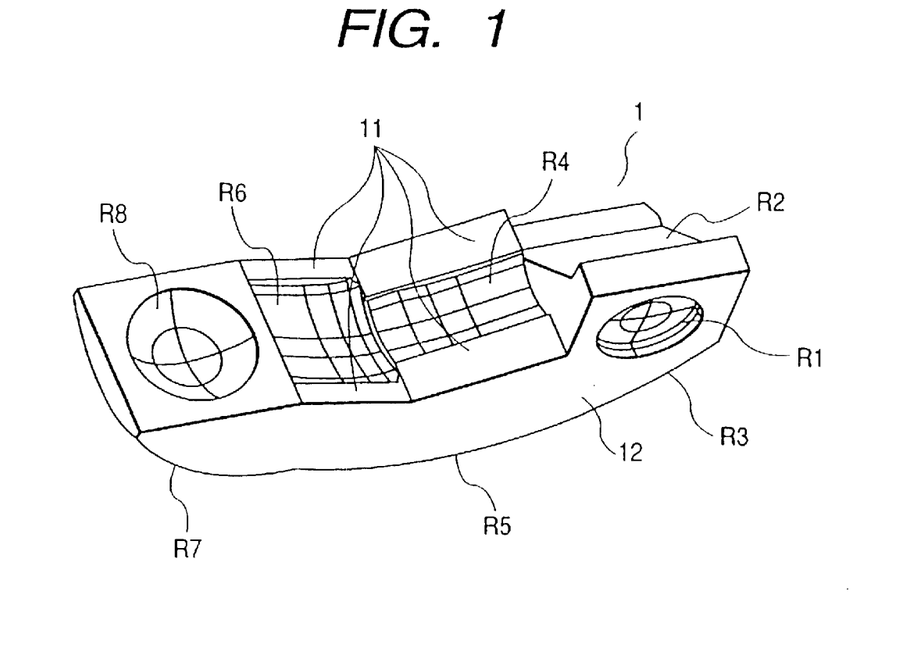
FIG. 1 is a view showing the structure of a reflection optical element according to the first embodiment of the present invention.

Embodiments of the optical element of the present invention will be described next. FIG. 1 is a schematic view showing a reflection optical element according to the first embodiment of the present invention.

The first embodiment has an off-axial optical system having, on surfaces of a transparent member, a plurality of curved reflection surfaces: two reflection surface groups opposing each other (the first reflection surface group comprising surfaces R3, R5, and R7 and the second reflection surface group comprising surfaces R4 and R6), and one reflection surface not opposing the reflection surface groups.

When the reflection optical element of this embodiment is to be used as an image sensing optical system, an aperture stop is disposed near an incident surface R1. An optical correction plate such as a low-pass filter (crystal plate) or an infrared cut filter is disposed near an exit surface R8 or joined to it. The image sensing surface of an image sensing element (image sensing medium) such as a CCD is located behind the optical correction plate.

The reference axis passes through the center of the stop and reaches the center of the final image plane (image sensing surface). The reflection surfaces R3 to R7 are formed from off-axial reflection surfaces tilted with respect to the reference axis.

Each of the two refraction surfaces R1 and R8 is formed from a rotationally symmetric spherical or aspherical surface or a flat surface. With this arrangement, the reference axis can be accurately set in manufacturing/evaluating the optical system.

When the reflection optical element of this embodiment is used for image sensing, a light beam from an object is regulated in its incident light amount by the stop. After this, the light beam is refracted by the incident surface R1 of a reflection optical element 1, reflected by the surfaces R2 and R3, and temporarily forms an image at a position between the surface R3 and the surface R4. The light beam is sequentially reflected by the surfaces R4, R5, R6, and R7, refracted by the exit surface R8, and exits the surface. An object image is formed on the image sensing surface through the optical correction plate.

Referring to FIG. 1, the two convex mirrors R4 and R6 have larger curvatures than those of the remaining surfaces. Compensation portions 11 having shapes different from the reflection surfaces R4 and R6 are formed on the sides of side surfaces 12 and 13 (not shown) of the reflection surfaces R4 and R6, thereby preventing the ridge portions between the reflection surfaces R4 and R6 and the side surfaces 12 and 13 from becoming acute.

In the first embodiment, the width of at least one of the plurality of reflection surfaces is smaller than the distance between the side surfaces.

This arrangement also prevents any large step at the boundary between the reflection surfaces R4 and R6 (as is apparent from the boundary between the reflection surfaces R3 and R5 shown in FIG. 8 and the boundary between the reflection surfaces R4 and R6 shown in FIG. 9, the step near the center of each reflection surface is small, but the step becomes larger as it is close to a side surface). This also applies to the reflection surfaces R4 and R6 formed from concave mirrors as far as the curvatures are large.

In the first embodiment, when two surfaces of each of the reflection surfaces R3, R5, and R7 have a curvature difference, a step is formed at the boundary near the side surfaces 12 and 13. To prevent this, compensation portions are preferably formed not to make large steps. In the first embodiment, the compensation portions are formed from flat surfaces. The compensation portions may be formed from curved surfaces.

In the first embodiment, both the reflection surfaces R4 and R6 have compensation portions. However, an effect can be obtained even when compensation portions are formed for only one reflection surface with a larger curvature.

This embodiment is not limited to the shape of the reflection optical element shown in FIG. 1, and any other shape can be employed.

Figure 2:
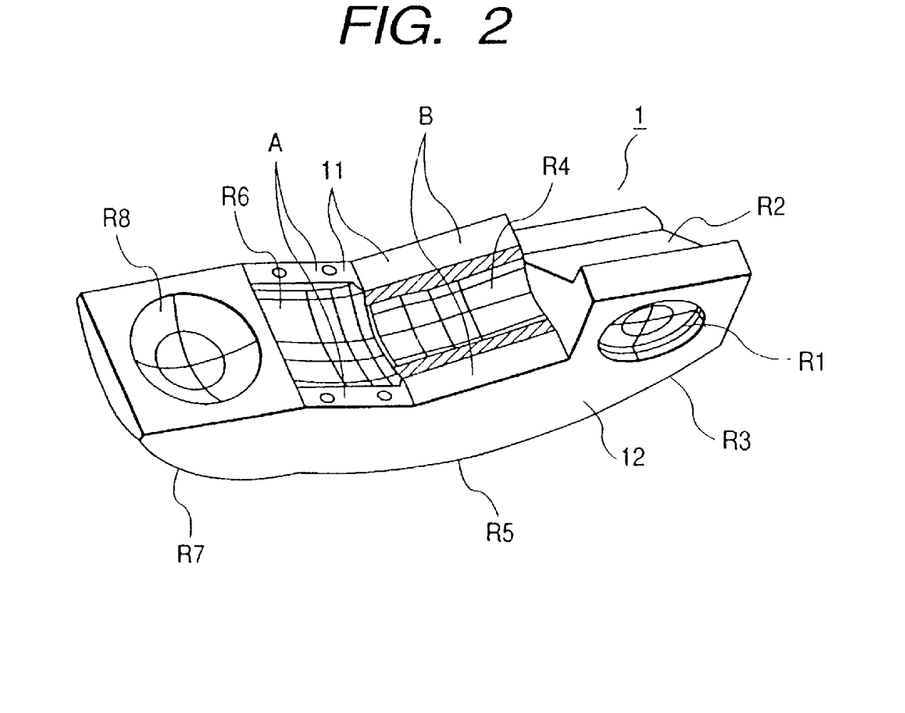
FIG. 2 is a view showing the structure of a reflection optical element according to the second embodiment of the present invention.

FIG. 2 is a schematic view showing a reflection optical element according to the second embodiment of the present invention. A reflection optical element 1 of the second embodiment has the same structure as in the first embodiment except that compensation portions 11 have molding auxiliary portions A and B having shapes different from those of surfaces R4 and R6.

The molding auxiliary portion A is the ejection portion of an ejector pin. The molding auxiliary portion B is a draft. In this reflection optical element 1, an intermediate imaging plane is formed near the reflection surface R4, and a pupil is formed near the reflection surface R6. These surfaces are sensitive to distortion and spherical aberration, and the surface shapes must be accurately guaranteed.

In the second embodiment, the molding auxiliary portions A and B are added to the compensation portions 11 to improve the mold release characteristics to mold, suppress the surface shape error or surface distortion in molding, and prevent degradation in aberrations such as distortion and spherical aberration.

In addition, the molding auxiliary portions A and B are added to the compensation portions 11, and portions where the molding auxiliary portions A and B are added need not be newly ensured. It is advantageous in forming a compact reflection optical element and increasing the degree of freedom of shape.

In the second embodiment, the drafts B are added to the compensation portions 11 of the reflection surface R4, and the ejection portions A of ejector pins are added to the compensation portions 11 of the reflection surface R6. However, the present invention is not limited to this. To minimize the manufacturing errors, molding auxiliary portions may be formed on all reflection surfaces.

In this embodiment, the types, positions, and number of molding auxiliary portions are appropriately designed in consideration of the manufacturing method, design values, and cost.

In this embodiment, the shape of the reflection optical element is not limited to that shown in FIG. 2. The reflection optical element can have any other shape.

Figure 3:
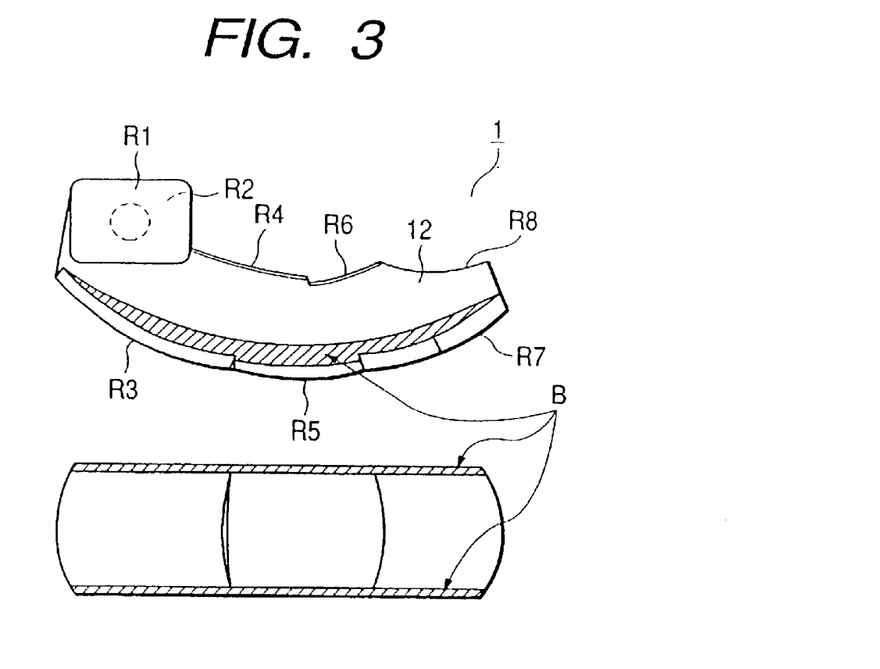
FIG. 3 is a view showing the structure of a reflection optical element according to the third embodiment of the present invention.

FIG. 3 is a schematic view showing a reflection optical element according to the third embodiment of the present invention.

Molding auxiliary portions (drafts) B are formed on the side of all reflection surfaces of one reflection surface (R3, R5, and R7) group out of two reflection surface groups opposing each other. The shape of a reflection optical element 1 is the same as in the first and second embodiments except for the reflection surface group having the molding auxiliary portions.

When molding auxiliary portions are formed on the side of all reflection surfaces of one reflection surface group, any variation in mold release characteristics of the reflection surface group is suppressed, and any manufacturing error can be suppressed. In the third embodiment, the molding auxiliary portion B is a draft. However, the present invention is not limited to this. The molding auxiliary portion B may be a curved surface smoothly joining the reflection surfaces and side surfaces whereby any manufacturing error can be suppressed.

Figure 4:
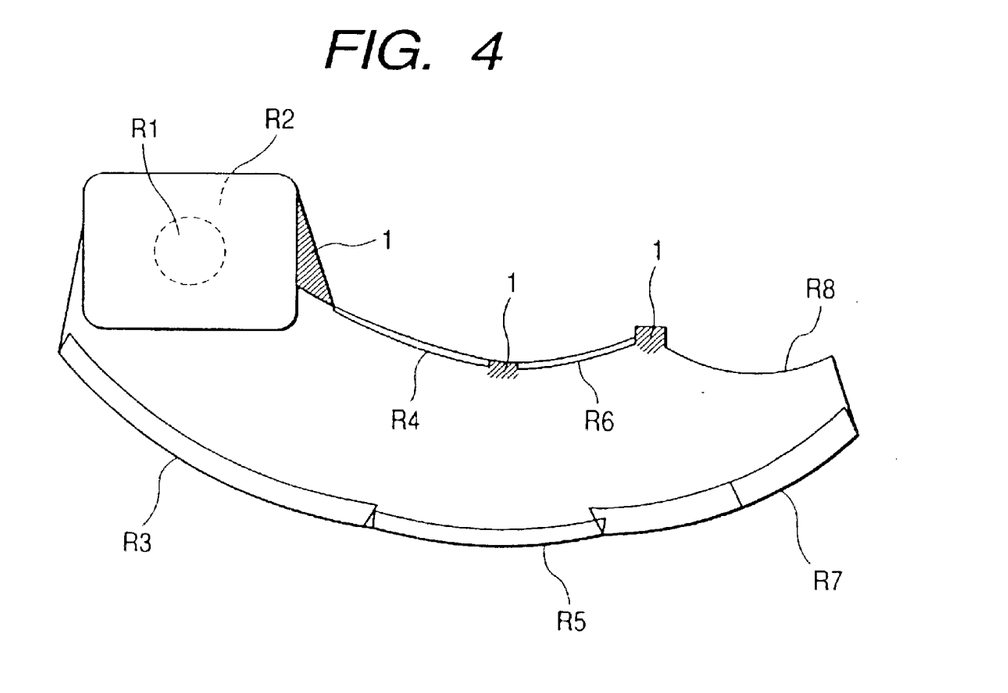
FIG. 4 is a view showing the structure of a reflection optical element according to the fourth embodiment of the present invention.

FIG. 4 is a schematic view showing a reflection optical element according to the fourth embodiment of the present invention.

A reflection optical element 1 of the fourth embodiment has, on surfaces of a transparent member, two reflection surface groups opposing each other, and one reflection surface not opposing the reflection surface groups, as in the first embodiment. Object light is incident from a refraction surface (incident surface) R1. The direction of light is changed 90° by a flat mirror R2. The light is repeatedly reflected by a concave mirror R3, a convex mirror R4, a concave mirror R5, a convex mirror R6, and a concave mirror R7, and exits from a refraction surface (exit surface) R8.

Referring to FIG. 4, a joint portion a1 joins the reflection surface R2 and reflection surface R4, which do not oppose each other, without forming any step.

In this example, the joint portion a1 has a flat surface and also serves as a draft.

Figure 5:
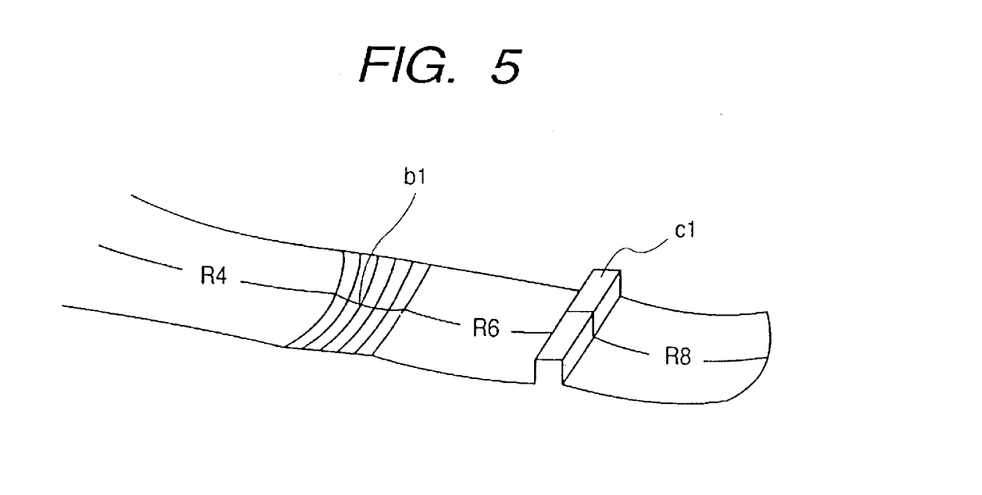
FIG. 5 is a view showing part of the reflection optical element according to the fourth embodiment of the present invention.

FIG. 5 is a perspective view showing the reflection surfaces R4 and R6, the refraction surface R8, and joint portions b1 and c1. As is apparent from FIG. 5, the joint portion b1 has a curved surface and joins the reflection surfaces R4 and R6 without forming any step and any sharp ridge, though the reflection surfaces are not smoothly joined.

The connection portion c1 has a bank shape which prevents any sharp ridge portion from forming at the end portions of the reflection surface R6 and refraction surface R8 and reinforces the end portion of each surface.

In this embodiment, the joint portion a1 has a flat surface, the joint portion b1 has a curved surface, and the joint portion c1 has a bank shape. However, the present invention is not limited to this. The shapes, positions, and number of joint portions must be appropriately designed in consideration of the manufacturing method, design values, and cost.

The fourth embodiment is not limited to the shape shown in FIG. 4, and any other shape can be employed.

Figure 6:
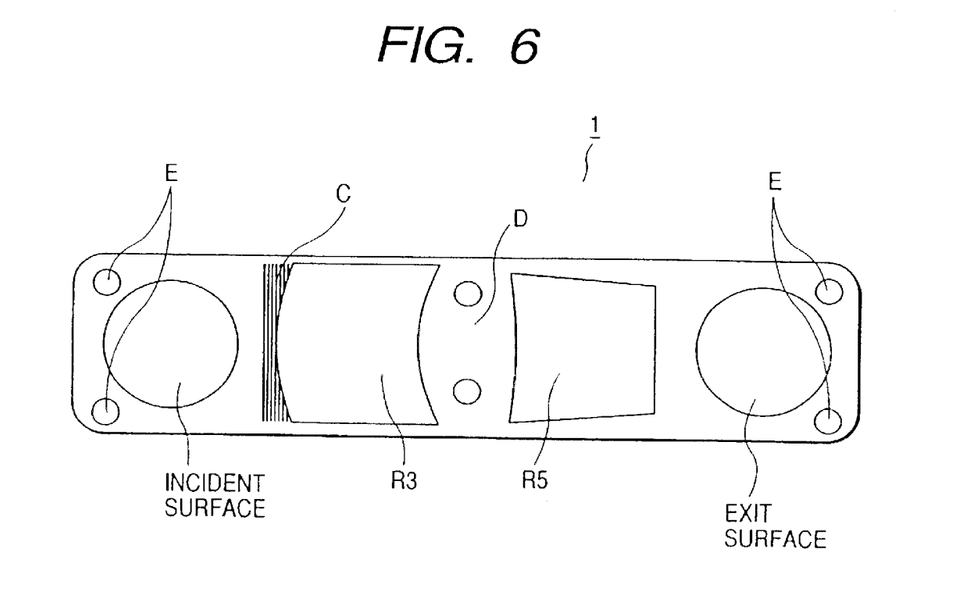
FIG. 6 is a view showing the structure of a reflection optical element according to the fifth embodiment of the present invention.

FIG. 6 is a schematic view showing a reflection optical element according to the fifth embodiment of the present invention. The shapes of refraction surfaces and reflection surfaces of the fifth embodiment are the same as those of the optical element shown in FIG. 8. FIG. 6 shows the reflection optical element viewed from an incident surface (R1) side.

In the fifth embodiment, molding auxiliary portions C and D are formed at joint portions between optical surfaces. The molding auxiliary portion C is a draft. The molding auxiliary portion D is the ejection portion of an ejector pin.

In a reflection optical element 1, an intermediate imaging plane and a pupil are formed near two reflection surfaces R4 and R6, respectively, as in FIG. 8. These surfaces are sensitive to distortion and spherical aberration, so the surface shapes must be accurately guaranteed.

In this embodiment, the molding auxiliary portions C and D are formed to improve the mold release characteristics of the mold, suppress the surface shape error or surface distortion, and prevent degradation in aberration, such as distortion or spherical aberration. When the molding auxiliary portions C and D are formed at the joint portions, portions where the molding auxiliary portions need not be newly ensured. Hence, a compact reflection optical element can be formed, and the degree of freedom of shape can be increased.

In this embodiment, molding auxiliary portions E (ejection portions of ejector pins) are also formed around two refraction surfaces to improve the mold release characteristics on the refraction surfaces.

In this embodiment, the molding auxiliary portion C has a draft, and the molding auxiliary portions D and E have the ejection portions of ejector pins. However, the present invention is not limited to this. The types, positions, and number of molding auxiliary portions must be appropriately designed in consideration of the manufacturing method, design values, and cost.

The fifth embodiment is not limited to the shape of the optical element shown in FIG. 6, and any other shape can be employed.

Figure 7A:
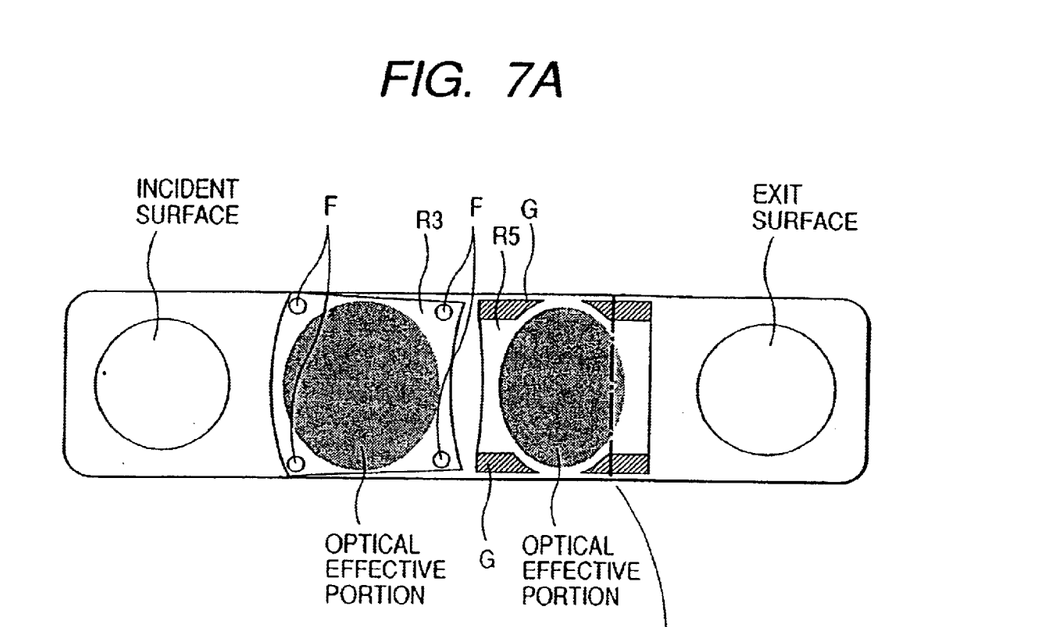
FIGS. 7A and 7B are views showing the structure of a reflection optical element according to the sixth embodiment of the present invention.
Figure 7B:
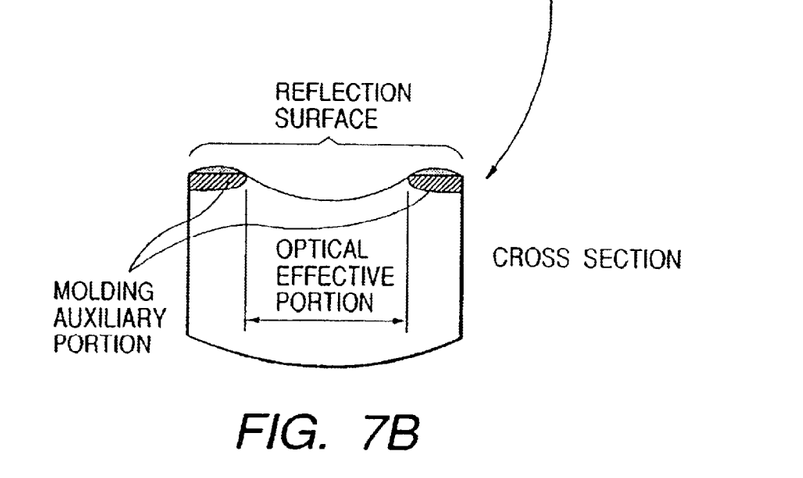

FIGS. 7A and 7B are schematic views showing a reflection optical element according to the sixth embodiment of the present invention. The shapes of refraction surfaces and reflection surfaces of the sixth embodiment are the same as those of the optical element shown in FIG. 8. FIG. 7A shows the reflection optical element viewed from an incident surface (R1) side.

When the optical effective surface of a reflection surface of the reflection optical element is present near the side surface, it is difficult to form compensation portions on both sides of the reflection surface, as in the first embodiment, or add molding auxiliary portions to the compensation portions, as in the second embodiment.

On the other hand, a light beam is not incident on the entire region of a reflection surface, and there is a portion with minimum influence on the optical performance, as in the reflection optical element shown in FIG. 8.

In this embodiment, molding auxiliary portions F and G are formed at portions of reflection surfaces with minimum influence on the optical performance.

The molding auxiliary portion F is the ejection portion of an ejector pin, which improves the mold release characteristics of this reflection surface. The molding auxiliary portion G has a moderate curved surface near the optical effective portion which improves the mold release characteristics of this reflection surface.

When the molding auxiliary portions F are formed at the joint portions, portions where the molding auxiliary portions need not be newly ensued. Hence, a compact element can be formed, and the degree of freedom of shape can be increased.

In this embodiment, the molding auxiliary portions F have the ejection portions of ejector pins, and the molding auxiliary portions G have moderate curved surfaces. However, the present invention is not limited to this. The shapes, positions, and number of joint portions must be appropriately designed in consideration of the manufacturing method, design values, and cost.

The sixth embodiment is not limited to the shape of the optical element shown in FIG. 7, and any other shape can be employed.

In the above embodiments, one reflection optical element functions as a lens unit which has desired optical performance and forms an actual image as a whole. However, a reflection optical system having at least one reflection optical element and constituted by a plurality of optical blocks may be constructed.

Additionally, zooming may be realized by changing the relative position between at least two reflection optical elements of the plurality of optical blocks.

As has been described above, a compact optical element capable of having a free shape, and an optical system using the optical element can be provided. In the optical element, the first reflection surface group having two or more refraction surfaces and a plurality of reflection surfaces, which are adjacent to each other, and the second reflection surface group opposing the first reflection surface group and having one or a plurality of reflection surfaces adjacent to each other, are arranged on surfaces of a transparent member. At least one of the reflection surfaces has a curvature and two side surfaces opposing each other. A light beam is incident from one refraction surface into the transparent member, is repeatedly reflected by the plurality of reflection surfaces, and exits from the other refraction surface. An object image is observed or an object image is formed on a predetermined surface using the optical element having the above arrangement. Portions other than the optical effective portion of the optical element have shapes different from the shape of the optical surface such that the step at the boundary between optical surfaces is minimized. In addition, molding auxiliary portions are formed at the boundary portions, thereby minimizing the surface shape error.

What is claimed is:

1. An optical element formed from a transparent optical material, comprising:

two refraction surfaces;

a first reflection surface group having a plurality of internal reflection surfaces arrayed in a predetermined direction;

a second reflection surface group opposing said first reflection surface group and having at least one internal reflection surface;

a connecting portion formed between adjacent surfaces among said two refraction surfaces, said plurality of internal reflection surfaces of said first reflection surface group, and said at least one internal reflection surface of said second reflection surface group, which does not substantially influence optical performance; and a molding auxiliary portion for assisting in performing a molding operation, said molding auxiliary portion being provided at said connecting portion, wherein light incident from one refraction surface is alternately reflected by the internal reflection surfaces of said first reflection surface group and the internal reflection surface of said second reflection surface group and guided to the other refraction surface.

2. An element according to claim 1, wherein said molding auxiliary portion comprises an ejection portion of an ejector pin.

3. An element according to claim 1, wherein said molding auxiliary portion comprises a draft for ejecting said optical element from a mold.

4. An optical system comprising:

said optical element of claim 1; and an aperture stop.

5. An element according to claim 1, wherein said molding auxiliary portion assists in performing the molding operation by being configured to improve mold release characteristics.

6. An element according to claim 1, wherein said molding auxiliary portion assists in performing the molding operation by being configured to suppress surface shape error or surface distortion in molding.

7. An optical element formed from a transparent optical material, comprising:

two refraction surfaces;

a first reflection surface group having a plurality of internal reflection surfaces arrayed in a predetermined direction;

a second reflection surface group opposing said first reflection surface group and having at least one internal reflection surface; and a molding auxiliary portion for assisting in performing a molding operation, said molding auxiliary portion being provided at a portion which does not substantially influence optical performance, wherein light incident from one refraction surface is alternately reflected by the internal reflection surfaces of said first reflection surface group and the internal reflection surface of said second reflection surface group and guided to the other refraction surface, and wherein said molding auxiliary portion is provided at a portion which does not substantially influence optical performance on at least one of the plurality of internal reflection surfaces of said first reflection surface group and said at least one internal reflection surface of said second reflection surface group.

8. An element according to claim 7, wherein the internal reflection surface having said molding auxiliary portion at the portion which does not substantially influence optical performance has a curved surface.

9. An element according to claim 7, wherein said molding auxiliary portion comprises an ejection portion of an ejector pin.

10. An element according to claim 7, wherein said molding auxiliary portion comprises a draft for ejecting said optical element from a mold.

11. An element according to claim 7, wherein said molding auxiliary portion assists in performing the molding operation by being configured to improve mold release characteristics.

12. An element according to claim 7, wherein said molding auxiliary portion assists in performing the molding operation by being configured to suppress surface shape error or surface distortion in molding.

* * * * *

UNITED STATES PATENT AND TRADEMARK OFFICE
CERTIFICATE OF CORRECTION

PATENT NO. : 6,890,081 B2
DATED : May 10, 2005
INVENTOR(S) : Toshihiro Sunaga et al.

It is certified that error appears in the above-identified patent and that said Letters Patent is hereby corrected as shown below:

Delete Drawing sheet 2, consisting of Figs. 3 and 4 and replace with the attached drawing sheet.

Signed and Sealed this

Sixth Day of June, 2006

JON W. DUDAS
*Director of the United States Patent and Trademark Office*

FIG. 3

FIG. 4